OR 3,588,218

[redacted]

X 3024 N

United States

[11] 3,588,218

[72] Inventors Robert P. Hunt Menlo Park; Baron C. Dickey, East Palo Alto; Samuel Bousky, Redwood City, Calif.
[21] Appl. No. 869,785
[22] Filed Oct. 27, 1969
[45] Patented June 28, 1971
[73] Assignee Ampex Corporation Redwood City, Calif.

[54] MULTIPLE SPOT, OPTICAL SCANNER UTILIZING PERIODIC LIGHT BEAM REFOCUSING
10 Claims, 7 Drawing Figs.

[52] U.S. Cl. .......... 350/7, 178/7.6
[51] Int. Cl. .......... G02b 17/00
[50] Field of Search .......... 178/7.6; 350/6, 7, 285; 250/219

[56] References Cited

UNITED STATES PATENTS 2,532,098 11/1950 Holcomb .......... 178/7.6
3,235,660 2/1966 Treseder et al. .......... 178/7.6

*Primary Examiner*—David Schonberg
*Assistant Examiner*—Michael J. Tokar
*Attorney*—Robert G. Clay

ABSTRACT: A multiple spot scanner utilizing an optical relay system in which at least one optical beam is periodically refocused to define a plurality of scanning light spots along a common scan locus. In a basic embodiment of a multiple spot scanner, the relay system reflects the beam around the perimeter of a square utilizing lenses and mirrors mounted within a rotating drum. The drum, and thus, the scan locus, is disposed against a lossless high reflectivity mirror. The focused beam forming the spots thus are returned to the rotating drum after each spot formation. A selected portion of the mirror is replaced with a length of a recording medium. Thus, all but one of the multiple number of spots formed by the relay system are returned to the scanner in a lossless fashion, while at all times one spot is scanning the recording medium. A modulating magnetic field is provided to determine the state of magnetization of the medium, and thus the recorded history.

Various adjunct features, associated apparatus, and modifications, may be incorporated in accordance with the invention utilizing the multiple spot optical scanner. For example, the invention apparatus may include; magnetooptic readout (light polarization rotation); photographic readout (a light amplitude readout scheme disposed either adjacent the medium or outside the optical system), a light differential cancellation scheme, a plurality rather than a single entrant beam, a spot deflecting system for providing tracking of the recorded scan lines during the readout process, etc. Thus, in a record and/or readout system the optical scanner may be employed with a photographic or a magnetic recording medium, which determines various ones of the above mentioned adjunct features.

INVENTORS
ROBERT P. HUNT,
BARON C. DICKEY,
SAMUEL BOUSKY
BY
Robert H. Clay
ATTORNEY

INVENTORS
ROBERT P. HUNT,
BARON C. DICKEY,
SAMUEL BOUSKY

BY

Robert S. Clay
ATTORNEY

INVENTORS
ROBERT P. HUNT,
BARON C. DICKEY,
SAMUEL BOUSKY
BY
Robert S. Clay
ATTORNEY

MULTIPLE SPOT, OPTICAL SCANNER UTILIZING PERIODIC LIGHT BEAM REFOCUSING

BACKGROUND OF THE INVENTION

1. Field

The present invention relates to optical scanning systems, and more particularly to a light beam optical scanner for scanning a continuous recording medium with a plurality of periodically focused, light spots having a selected scanning field.

2. Prior Art

In general, there are three basic categories of scanning systems applicable to both laser and/or electron beam recording systems. These categories are divided on the basis of where within the spot forming system the deflecting means is introduced, and include; entrant beam scanning, exit bundle scanning, and pupil scanning.

In the entrant beam scanning category the ray bundle entering the spot forming lens is rotated about an axis through the lens such that the beam always enters the pupil. The method utilizes an off-axis spherical mirror and associated optical members to reflect the beam back towards the lens along a preselected path, while sweeping the beam through a selected angle. Such a system is not optically feasible for large incident angles because of the f-number requirement for the concentric lens. For example, at 30° incidence, this requirement is *f*/0.78 which is not practical to attain. The maximum *f*-number attainable (though not necessarily practical), is generally *f*/1.2, which corresponds to about 20° incidence. Typical of an entrant beam scanning device is that described in U.S. Patent Application No. 558,902, f.c. June 20, 1966, now Patent No. 3,520,586 to Samuel Bousky, and assigned to the same assignee as the present application.

In the exit bundle scanning category, scanning is effected by introducing a reflecting surface in the exit ray bundle between the focusing lens and the focused spot. This method is limited due to the introduction of appreciable scan nonlinearity and shift of focal position because of translation errors. In addition, unless dual entrance beams are employed, excessive dead time occurs as the corners between successive mirror faces traverse through the exit bundle. The input beam reflected from a single pyramid face can be made to scan a fixed focus track on the recording medium; however, the geometry of the reflection from the medium is such that the reflective beam cannot be captured for derotation throughout the scan, as is desired in magnetooptic readout. This is caused by the incident plane rotating with respect to the scanned plane during the scan. Thus the exit bundle scanning device configuration does not readily lend itself to an optical system which permits capture and derotation of the reflected beam after incidence with the recording medium. Further, it is generally necessary to utilize a total glass path through the optical system which is prohibitively long, which causes inefficient handling of the available light beam. Exit bundle scanning devices were employed in the past as facsimile scanners for newspaper picture transmission.

The pupil scanning category produces scanning by rotation of the lens pupil itself, wherein the focused spot sweeps along a circular arc. With optical modifications this latter type of device inherently provides a flat scanning field which is preferable for laser beam scanners, since such a scan configuration minimizes high speed search and tracking errors.

SUMMARY OF THE INVENTION

In the pupil scanning device of the present invention an optical relay system mounted within a rotating frame of reference (a rotatable optical scanner) makes use of a series of high reflectivity mirrors and lenses to form a multiplicity of consecutive scanning spots. All scanning spots are returned to the rotatable scanner by laser reflectors, e.g., dielectric mirrors, except for the one spot which actually scans the film in a selected scan configuration. An optical (entrant) beam, preferably generated by laser beams, is introduced generally along the axis of the rotating frame by an optical mirror system. The beam is then reflected outwardly towards the periphery of the scanner whereupon it is reflected into a focusing lens. The resulting spot is focused onto a laser reflector of selected configuration, reflected into a collimating relay lens, and is then directed to a succeeding focusing and collimating lens pair. Thus, the beam is routed around the rotatable optical scanner. One section of the scanner of size commensurate with the number of scanning spots is occupied by the recording medium, whereby the selected scan by the successive scan spots is effected.

The invention may assume various configurations depending upon the particular application and the type of recording and/or readout desired. For example, in a laser beam record/magnetooptic readout system, the light beam must be retrieved from the optical system without producing significant depolarization, and without "rotating" the plane of polarization during the course of the scan cycle. In addition, the optical efficiency must be optimized to improve the signal to noise ratio, the angle of incidence of the beam on the medium is preferably 45°, the optical spot is maintained within its depth of focus, and the reflected beam is retrieved and the polarization detected.

To this end, a pair of quarter wave plates are utilized in the magnetooptic readout configuration, whereby the laser beam is polarized at 45° to the axis of the first quarter wave plate, to provide circularly polarized light. The first quarter wave plate is mounted in the stationary frame of reference. On the axis of the scanner (i.e. the rotating frame of reference), rotating therewith, is fixed a second quarter wave plate which transforms the circularly polarized light impinging thereon into plane polarized light rotating with the scanner. Thus efficient transmission of the light beam is accomplished between stationary and rotating portions of the apparatus without adversely affecting the beam. Thus light is introduced onto the scanner with minimum light loss (approximately 10 percent relative to the output of a first polarizer). The light intensity varies by no more than 2 percent with scan angle.

Other modifications to the apparatus within the spirit of the invention include, a differential cancellation scheme utilizing two exit light beams; photographic rather than magnetooptic readout, including light gathering means associated with the readout process, disposed immediately adjacent the recording medium or completely removed from the rotating scanner; deflecting means for transversely deflecting the scanning beams, i.e., spots, for purposes of tracking; source and/or optical means for providing a plurality of entrant beams each of which form at least a pair of sequentially focused scan spots, rather than a single entrant beam which serially forms the entire plurality of scan spots; etc.

DESCRIPTION OF THE PREFERRED EMBODIMENTS

Figure 1:
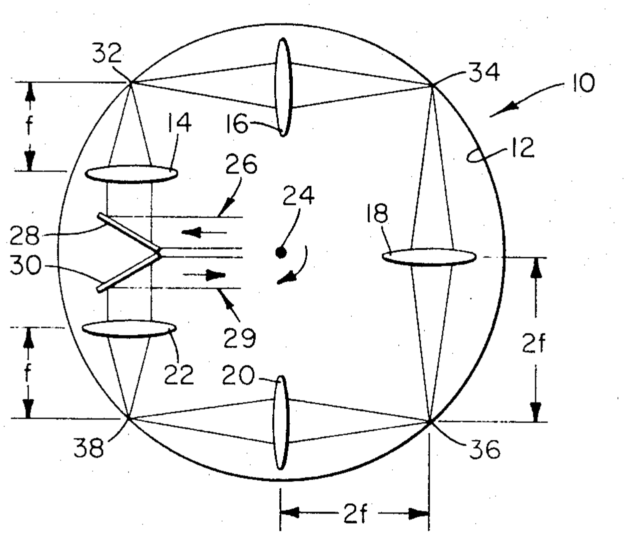
FIG. 1 is a simplified schematic of a basic optical scanning system of the invention, utilizing periodic refocusing of scan spots to define an arcuate scan path.

Referring to FIG. 1 there is shown in simplified schematic a basic arrangement of an optical relay system for providing the beam focusing and relaying portions of a rotating scanner assembly embodiment 10. Accordingly, a fixed cylindrical internal mirror 12 has disposed therewithin a series of lenses 14—22 mounted on a rotating member (not shown). Lenses 16—20 are positioned periodically at distances equal to four focal lengths (*f*). The entrant and exit lenses 14 and 22, respectively, are positioned at a distance equal to the focal length *f* to collimate the associated beam. The cylindrical mirror 12 has an axis 24 about which the entire optical assembly rotates. The cylindrical mirror 12 is stationary. An entrant beam 26 preferably is introduced along the rotational axis 24 and is directed radially outward therefrom to impinge on a mirror 28, whereupon it is introduced to the entrant lens 14. The beam is then serially directed through the consecutive lenses 16—22, and upon exiting from exit lens 22, is directed back towards the rotational axis 24 via a mirror 30. The resulting exit beam 29 is retrieved from the rotating scanner assembly 10 parallel, and adjacent to the axis 24. As may be seen, the beam is thus periodically refocused to define a plurality of focused scanning spots 32—38 along the inner circumference of the cylindrical mirror 12. In a practical record and/or readout system such as further described hereinafter by way of example only, the scanner assembly 10 includes a recording medium of selected recording properties which is substituted for an arcuate portion of the cylindrical mirror 12, whereby one scanning spot impinges the medium at all times, while the remaining spots scan the cylindrical mirror surface.

However, the scanner assembly embodiment 10 of FIG. 1 has several practical difficulties particularly with respect to magnetooptic readout systems. In the event the longitudinal Kerr effect is being utilized (in the most practical of the record/readout systems) the magnetization, and hence the applied fields, must lie in the plane of incidence (which coincides with the plane of the drawing). This requires a magnetic recording head for each spot 32—38, which complicates the assembly, since the record head must encompass the optical spot. However, if the relay optics are turned at 90° relative to the rotational axis 24, to thereby dispose the plane of incidence normal to the scan direction, a magnetic record head (not shown) can be made part of the stationary apparatus, which simplifies the scanner mechanism.

Figures 6, 7:
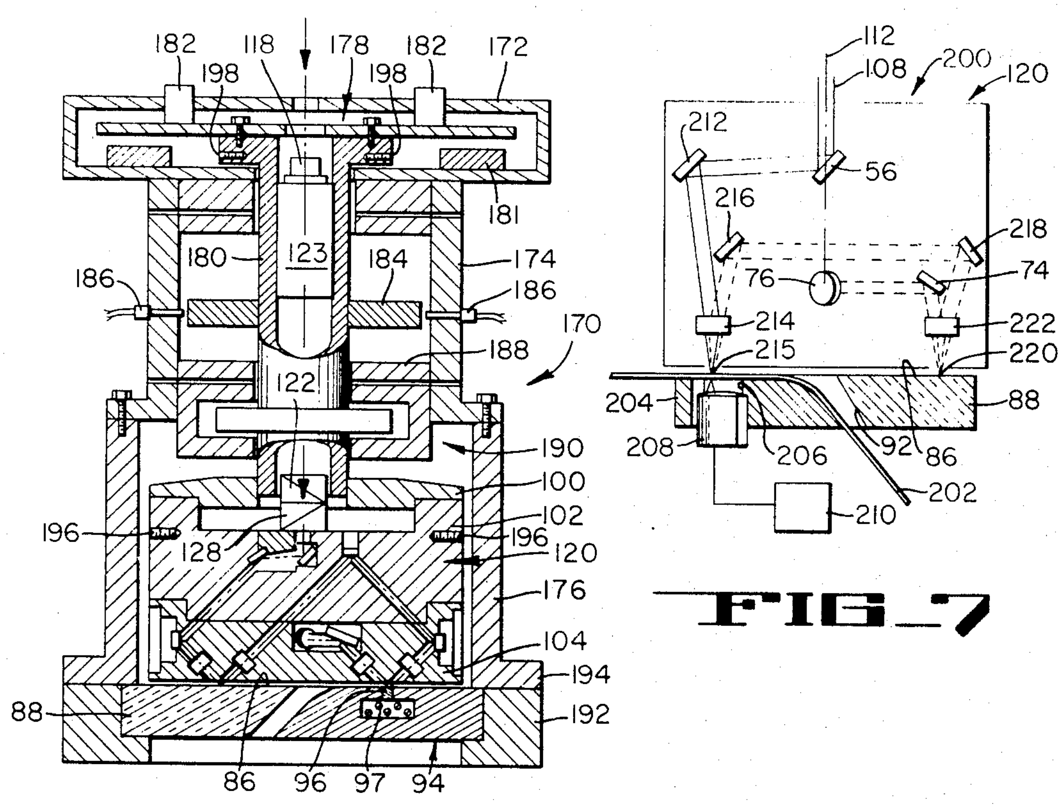
FIG. 6 is a cross section illustrating typical scanner assembly hardware, including mirror and lens positioning, beam path passageways, and bearing and motor means.
FIG. 7 is a partial cross section schematically illustrating an optical assembly particularly adapted for photographic readout.

In addition, for practical optical reasons a system utilizing five lenses, such as shown in FIG. 1, is difficult to align. It is preferable to utilize collimated light between scanning spots with separate focusing and collecting lenses for each spot. It is to be understood however, that for a photographic type readout system, the beam may impinge the (photographic) medium at essentially 90° thereto, and thus the beam is focused and collected by a single lens, as shown in FIG. 7.

Further, the embodiment of FIG. 1 does not incorporate a flat field of scan, which is desirable in that such a scan configuration minimized tape deformation and tracking errors. That is, generally a more accurate registration of the recording medium's position relative to the scanner results, if the recording medium is kept in a flat plane rather than in an arcuate curve, as in FIG. 1.

Figure 2:
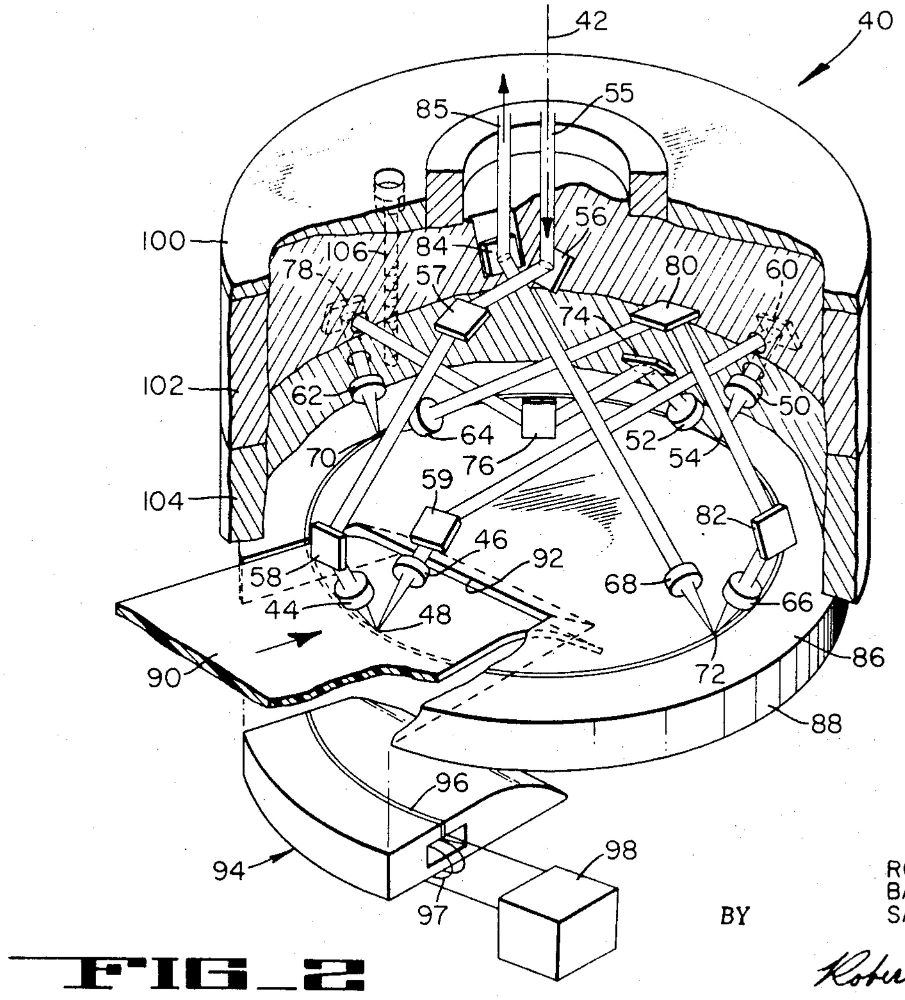
FIG. 2 is a perspective of a further sophisticated embodiment, which shows a recording medium positioned within the scanner, whereby a flat field of scan is provided on the tape.

The above mentioned inherent disadvantages of the embodiment 10 of FIG. 1 are overcome by a sophistication of the invention apparatus, shown in simplified form in FIG. 2. To this end, a scanner assembly embodiment 40 provides an optical relay system wherein the scan portion of the relay optics is disposed at 90° to the disposition of the optics shown in FIG. 1, to thus scan along a flat plane substantially normal to a rotational axis 42. The scanner assembly 40 utilized two lenses with each spot formed; thus, lenses 44, 46, are employed with spot 48 while lenses 50, 52, form spot 54. An (entrant) mirror 56 and mirrors 57, 58 are used to direct the collimated beam, (e.g., entrant beam 55) from the source (not shown) along the rotational axis 42 into the optical relay system. Mirrors 59, 60 are employed to relay the beam between the first two pairs of lenses 44, 46 and 50, 52.

In FIG. 2, the optics for two of the four scanning spots are shown disposed along a first plane along a diameter of the circular scan path. The optics for the other two lens pairs are disposed in a second plane normal to the plane of the first lens pairs. Thus two pairs of lenses 62, 64 and 66, 68 are disposed at opposite diametric positions and provide respective scan spots 70, 72 at radii equal to the radii of the spots 48, 54. A plurality of mirrors 74, 76 and 78 direct the beam from lens 52 to the second scan plane, and into the focusing lens 62. From the lens 64 the beam passes to mirrors 80 and 82 and into the lens 66 of the fourth lens pair. The beam leaving lens 68 is directed to an (exit) mirror 84 disposed off-axis in the region of the (entrant) mirror 56, whereby an exit beam 85 is retrieved from the rotating scanner assembly, adjacent and parallel to the axis 42. Thus the beam is periodically focused onto a flat high reflectivity mirror 86 at an angle of incidence 45°. The mirror 86 forms the facing surface of an optical flat 88. The plane of incidence of the scanner embodiment 40 is normal to the spot velocity vector and coincides with the radius vector running through the center of rotation about the rotational axis 42. Note, that if the mirrors employed in the scanner assembly are of the laser reflector variety, light losses are minimized to less than 1 percent loss per mirror. Thus the lenses may be AR-coated doublets corrected for the particular wavelength of light generated by the laser. The *f* number is 3.0 and the focal length is 0.60 inches. Spot diameter varies from 4 micrometers up, dependent on entrant beam diameter, with a maximum entrant beam diameter of the order of 3 millimeters.

The reflected radiation of each spot is collected and collimated by the lenses 46, 52, 64 and 68, which lenses are identical to the spot forming lenses 44, 50, 62 and 66. Note that the scan spots are oval in shape by virtue of the 45° angle of incidence, with the long axis thereof extending radially.

Provisions are made to introduce a recording medium 90, such as a continuous tape, to the scanning plane with a flat field configuration. To this end, a rectangular segment (not shown) is removed from the optical flat mirror 86 to provide a medium slot 92 and the recording medium 90 is disposed in place of the removed segment with the recording surface flush with the confining, adjacent surfaces of the high reflectivity mirror 86. Thus, three of the four spots simultaneously scan the mirror 86, with one of the spots (e.g., spot 48) always scanning the recording medium at any one instance.

As previously noted, there are various embodiments and adaptations available in accordance with the invention concepts. To facilitate the description thereof, the invention is illustrated in FIG. 2 in the form of a record/readout system employing the optical scanner assembly, a magnetic recording medium, a magnetic "write" head, and the magneticooptic readout concept and associated apparatus. However, it is to be understood that the scanner may as readily be used in conjunction with a photographic recording medium, medium developing apparatus and direct, light magnitude readout via a light gathering and sensing scheme. This system is further described hereinbelow with reference to FIG. 7. A scheme for magnetic recording via a laser beam is described in copending application Ser. No. 622,795, filed Mar. 13, 1967 now Pat. No. 3,365,659 to D. Treves and assigned to the assignee of this application.

With regards to the magnetic record/magnetooptic readout system partially illustrated in FIG. 2, a magnetic medium 90 passes through the scanner assembly over a head structure 94 formed for example of ferrite, which has an arcuate gap 96 extending in register with the scan radius of curvature of the plurality of spots. The head 94 may be a low conductivity head, energized by means of a coil 97 and current source means 98. The field produced by the head 94 is radial and hence lies along the track with a direction normal to the direction of scan. Thus, the magnetization generated coincides with the long axis of the (oval) optical spots, which feature tends to reduce the demagnetizing field. Although the head 94 is shown including a medium shaping and guiding member, the two could be separately built with the head disposed within the guide member.

Note that close registration of the flat dielectric mirror 86 and the recording medium coextensive therewith, relative to the scanner assembly 40, is maintained since the depth of focus of the converging light beams forming the spots 48, 54, 70 and 72 persists in the configuration of FIG. 2 for about 17 micrometers. Furthermore, the light energy preferably propagates in the same sense for each spot, e.g., the light beam always approaches from the same angle and direction for each spot relative to the medium 90.

Although only a short section of the medium 90 is shown in FIG. 2, obviously a tape transport (not shown) is provided to continuously introduce the medium with suitable tension, speed, guidance, etc., through the tape slot 92 of the optical flat 88.

By way of example only, the optical system of the rotatable portion of the scanner assembly 40 is preferably mounted in a solid scanner "drum" or "head" formed of several circular sections for ease of manufacture. Thus, three solid sections 100, 102 and 104 are provided, held together by a series of screws or bolts 106. Each section is made of a solid material having mechanical properties corresponding to those of optical glass such as, for example, annealed aluminum, with the necessary material for the various light paths, mirrors and lenses removed by machining operations. The lenses and mirrors of the optical system are then mounted to the various sections by associated mounting means (not shown) such as conventionally employed in the art. In the embodiment 40 the mirrors, 58, 60, 78 and 82 are those preferably rigidly mounted by adjustable means, e.g., differential screw arrangements, whereby alignment of the successive light paths is facilitated. Lens focusing is accomplished by adjustable spacer elements (not shown) which vary the position of the lens along the beam propagation direction.

Figure 3:
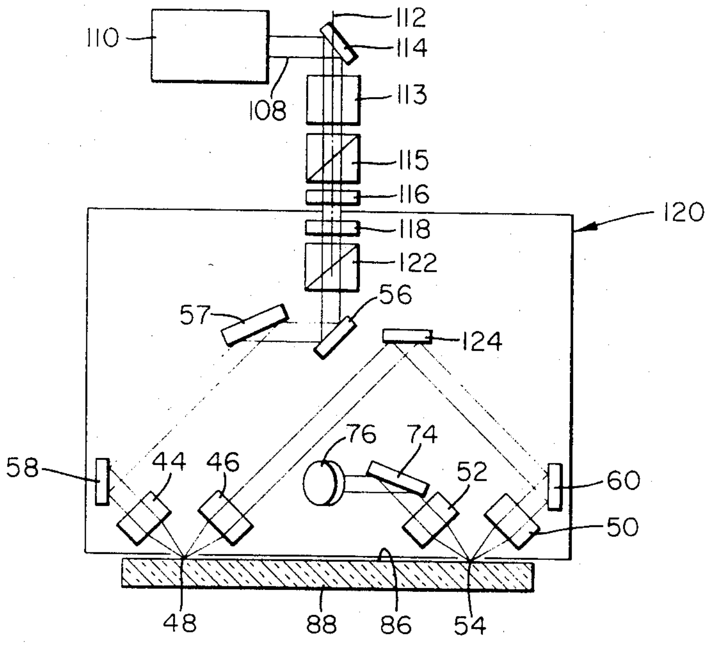
FIGS. 3, 4 and 5 are partial cross sections schematically illustrating various optical assemblies of the invention scanner particularly adapted for magnetooptic readout, including several modifications thereof.
Figure 4:
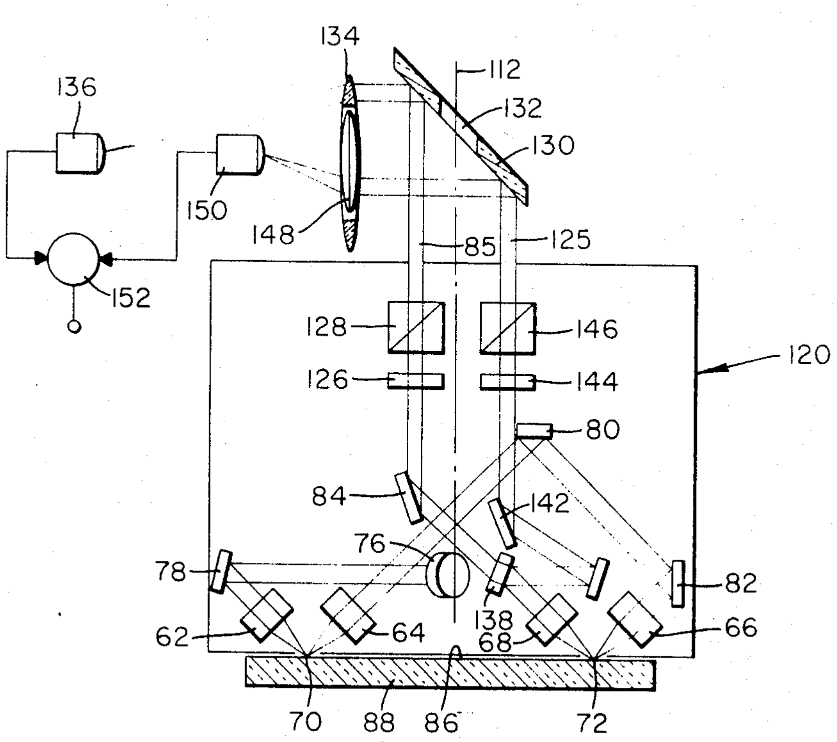
Figure 5:
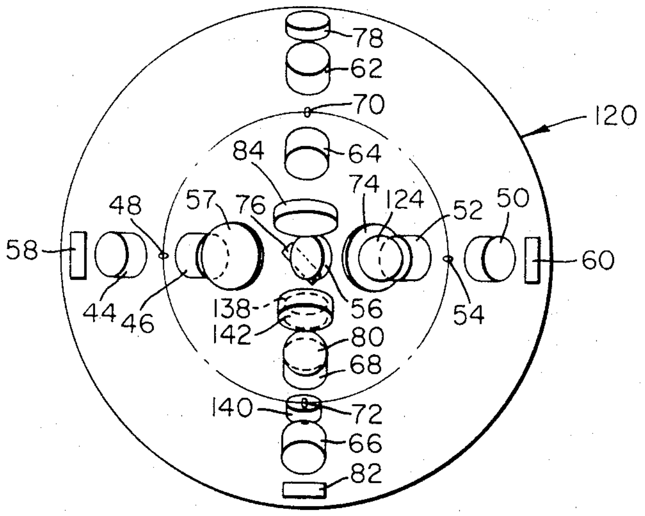

Regarding now FIGS. 3, 4 and 5 there is shown in greater detail, various optical assemblies which exemplify modifications to the invention. Accordingly, FIG. 3 illustrates additional optical apparatus utilized in the magnetooptic readout system of previous description, which enables optimum introduction of a laser beam to the rotating scanner assembly. FIG. 4 illustrates further optical apparatus for enabling the retrieval of a scanning light beam, either with one or more (two) exit paths, which includes a light sensing mechanism to enable the process of magnetooptic readout. FIG. 5 is a plan of the optics used in the scanner system of FIGS. 3 and 4, looking in the direction towards the medium along the rotational axis of the scanner assembly.

It is to be understood that although a specific configuration of lenses and mirrors are shown in FIGS. 3—5 as well as in FIG. 2 in the course of describing the invention concepts, various modifications to the specific configurations illustrated may be made.

To enable magnetooptic readout, the scanner of FIG. 3 must deal with polarized light without producing significant depolarization, or without "rotating" the plane of polarization during the course of the scan cycle. Due to the required accuracy of registration of the plane of polarization, it is furthermore desirable that the magnetooptic system from polarizer to analyzer be mounted on the scanner's rotating frame of reference.

Accordingly, by way of example only, a light beam 108 is generated by laser means 110, is deflected into and along a rotational axis 112 via a folding mirror 114. For recording purposes, the beam is passed through a light modulator (e.g., a Pockels modulator) 113, and thence to a first polarizer 115. Then the beam passes into a first quarter wave plate 116 and a second quarter wave plate 118. The quarter wave plate 116 is mounted on the stationary frame of reference, whereas the quarter wave plate 118 is mounted on the rotating frame of reference (e.g., within a "drum" or "head" 120 such as that defined by sections 100—104 of FIG. 2). In practice the quarter wave plates are antireflection coated to eliminate reflection losses. Also since quarter wave plates are not perfect, a (second) polarizer 122 is disposed to intercept the beam from quarter wave plate 118 to thus efficiently introduce the optical beam 108 to the rotating scanner optics which follow the polarizer 122. Accordingly there is no need for the usual complication of various, accurately designed, pyramids or polygons usually encountered in prior art scanners.

Tracking errors may be corrected utilizing beam deflector means 123 disposed to intercept the beam, for example, between the quarter wave plate 118 and the polarizer 122 (FIG. 6). The means 123 may be, for example, a Pockels cell which by altering its refractive properties due to the application of an electric field, causes a small deflection in beam direction to allow tracking errors to be corrected by conventional track error sensing and feedback circuits (not shown).

The remaining optical scanner system of FIG. 3 may be similar to that shown in FIG. 2 or, as shown, may be modified to provide a different arrangement of optical components which effect the multiple spot, flat field, scanning system in accordance with the invention. Like components are indicated by similar numerals. Accordingly, the mirror 56 is disposed along the rotational axis 112 of the scanner assembly to direct the beam 108 away from the axis, generally at right angles thereto. The beam is then intercepted and directed by means of mirrors 57 and 58 to the first pair of lenses 44 and 46. The lenses provide focusing of the beam to form the spot 48, and recollimation and thus retrieval of the incident beam, respectively. The recollimated beam is then reflected from a mirror 124 to a position diametrically opposite to the position of spot 48 within the support drum 120. The beam from mirror 124 is directed by mirror 60 towards the second pair of lenses 50, 52 whereby spot 54 is formed, and the beam is retrieved, respectively. Note that as in the case of the embodiment of FIG. 2 an optical flat 88 is disposed with the flat dielectric mirror 86 thereof positioned in the plane traced by the spots as the scanner assembly rotates. The retrieved beam is recollimated by the lens 52 and directed via the mirror 74 back towards the rotational axis 112 of the scanner assembly and against the mirror 76 disposed inline therewith.

As may be seen, the optical system up to this point provides a pair of diametrically opposed spots 48, 54 similar to those of the embodiment of FIG. 2. To provide a second pair of spots disposed upon a diameter which lies at right angles to the diameter extending between spots 48, 54, reference is made to FIG. 4.

Accordingly, FIG. 4 shows the second half of the optical scanner system as well as apparatus for retrieving a single or pair of exit beams (e.g., exit beam 85 of previous mention, and another exit beam 125) for subsequent use in readout. To continue the optical relay system, the beam from mirror 74 impinges the mirror 76, shown in both FIGS. 3 and 4, and is reflected essentially at right angles from mirror 76 to the mirror 78. From thence, the beam is directed to the third pair of lenses 62, 64, which respectively focus the beam to form the spot 70 and retrieve the beam upon reflection, and direct same to the mirror 80. The beam is then reflected to the mirror 82 disposed diametrically opposite the mirror 78 and lenses 62, 64. The beam is directed to a fourth pair of lenses 66, 68, which focus and retrieve the beam on and from the mirror 86, to define the spot 72.

In one embodiment of the invention (see FIG. 2 and 4) a single exit beam 85 is retrieved from the rotating scanner assembly by directing the light collimated by lens 68 directly to the mirror 84, which is disposed slightly off the axis 112. Mirror 84 directs the beam parallel to the axis, through a quarter wave plate 126 (which may be employed, but is not generally required), and an analyzer 128. The beam then exits from the rotating scanner assembly and impinges a stationary annular mirror 130 positioned at 45° with respect to the rotational axis 112. The annular mirror 130 has a central aperture 132 therein to allow passage therethrough of the entrant beam 108 shown in FIG. 3. The beam is reflected from the annular mirror 130, through a focusing lens 134 and thence is directed to a photomultiplier tube 136 or other light gathering device.

Magnetooptic readout is effected via the light gathering device, wherein a slight rotation of the plane polarized light impinging the recording medium caused by the magnetization which represents the recorded information, is converted to a light intensity variation by analyzer 128. The light intensity variation is subsequently detected by the photomultiplier tube 136 as an indication of the information stored on the medium 90.

Referring still to FIG. 4, there is shown a modification in the apparatus for retrieving the light beam and thus, for sensing the information recorded on the recording medium. To this end, the light differential detection scheme described in copending application U.S. application Ser. No. 583,509 to David Treves et al., filed Sept. 29, 1966 and assigned to the same assignee as this application, may be employed in combination with the beam retrieval apparatus of previous description. Accordingly, a beam splitter 138 is disposed in the light path from the lens 68 to the mirror 84, whereby approximately half the light beam is directed to a pair of mirrors, 140, 142, in sequence. Mirror 142 is generally diametrically opposed to the mirror 84 relative to the rotational axis 112. An (exit) beam 125 from mirror 142 is directed into a quarter wave plate 144 (which is optional) and an analyzer 146. Thus the exit beam 125 passes therefrom to strike the annular mirror 139 as does the first described exit beam 85, and is reflected from the mirror to a focusing lens 148. The beam then is focused onto a photomultiplier tube 150, or other like light gathering device. In such a dual beam, differential scheme the electrical outputs of photomultiplier tubes 136 and 150 are introduced to a wide band, low noise, differential amplifier such that an electrical measure of the difference between the two signals may be derived.

Referring now to FIG. 5, there is shown the optical system as viewed from the top of the supporting drum 120. The components of FIG. 5 are identical to those shown in both FIGS. 3 and 4, beginning at the point where the entrant beam 112 leaves the analyzer 122, and prior to the point where the exit beams 85 and 125 enter the quarter wave plates 126, 144 respectively. Accordingly, the components of FIG. 5 comprises generally the optical relay system for forming the diametrically opposed plurality (e.g., four) of scan spots.

FIG. 6 illustrates practical hardware for a scanner-motor assembly 170, defined generally by a motor housing 172, a bearing housing 174 and a scanner housing 176, suitably welded or bolted together to form an integral unit. The motor housing 172 encloses a printed circuit DC motor 178 utilizing a pancake type structure which is readily combined with a hollow shaft 180 to allow the entrant and exit beams to pass through the scanner-motor assembly 170 to the scanner assembly drum 120. The armature of the motor 178 has copper conductors (not shown) printed on a laminated board, and the field is supplied by a high coercivity permanent magnet 181. Brushes 182 are provided for electrical input. Since the motor 178 is generally a conventional off-the-shelf item, same is not further described herein. By way of example, the motor may be a type 16 FF, manufactured by Printed Motors Inc., Glen Cove, New York, and capable of delivering a maximum of 48 ounce-inches of torque at speeds of the order of 5,000 to 8,000 r.p.m.

The motor is kept at constant speed as conventially practiced in the art by suitable means such as, for example, a tachometer disc 184 secured to the shaft 180. Magnetic transducers 186 are disposed through the housing 174 to approach the periphery of the disc, to sense the speed of rotation of the disc and thus of the scanner-motor assembly 170. By way of example only, to maintain good tracking characteristics, each scan starts at the same point along the length, by first referencing a position on the scanner uniquely to a fixed fiducial mark during initial set up procedures. Thereafter the position servo (not shown) maintains the position by observing the once-around rate of the scanner and phase-comparing same with a reference. Since servo systems utilizing discs in combination with disc sensing transducers, are well known in the art, same are not further described herein.

The bearing housing 174 also houses an air bearing assembly 188 adapted to support the rotating shaft 180 in operation. Suitable sources of air (not shown) are coupled to the various apertures extending through the housing 174 and assembly 188, whereby air is supplied to support the shaft 188 in conventional manner. A thrust bearing 190 is provided about the shaft 180 to confine the shaft and thus the optical assembly drum 120 in axial position relative to the optical flat 88, i.e., relative to the flat high reflectivity mirror 86.

By way of illustration only, the scanner housing 176 is provided with circular flanges 192, 194, which are employed with brackets, bolts, etc., to retain the optical flat 88 in position adjacent the scanning face of the scanner assembly drum 120, within the required focusing tolerance.

Various portions of the scanner apparatus of FIG. 6 have been broken out to reveal the disposition of the various optical apparatus of previous mention. By way of example there is shown, the quarter wave plate 118, the beam deflector means 123, the polarizer 122 and the analyzer 128, mounted respectively within the shaft 180 and drum 120 for rotation therewith. Note in the FIG. 6 only the quarter wave plate 118 is employed (with the entrant beam) and thus the second quarter wave plate 120 (or 144) is omitted. The entrant beam passes through the quarter wave plate 118 and the polarizer 122, and the exit beam passes through only the analyzer 128. The several circular sections 100, 102 and 104 are shown in greater detail, to illustrate the respective machined portions which receive the various lenses and mirrors, and their respective conventional fixed or adjustable mounting means. The beam passes between the lenses and mirrors via interconnecting, straight, passageways drilled through the sections 102, 104. As may be seen, the arrangement of lenses and mirrors is essentially the same as that shown in FIG. 3, and accordingly is not further described here.

To provide means for balancing the rotating scanner assembly, a plurality of screws 196, 198 are disposed in threaded bores formed at spaced intervals about the drum 120 and shaft 180. Fine adjustment of the drum balance is accomplished by radially varying the position of the screws in accordance with the unbalance senses by conventional balancing apparatus.

In a practical apparatus such as the laser record/magnetooptic readout system of FIGS. 3—6, a fundamental difference may exist in the optical path; i.e., the optical path formed by the scanner apparatus may vary depending on which spot is scanning the medium. More particularly, a different signal level is obtained from each spot as it scans the medium, due to the relative phase differences. To compensate for this difference, a phase compensating element (not shown) may be inserted between the polarizer (122) and the analyzer (128) (146). This element is electrically controllable and is programmed for each of the multiple spots forming the scanner.

Referring to FIG. 7, there is shown alternative apparatus 200 in accordance with the invention, utilizing the photographic readout concept of previous mention and employing a photographic recording medium 202. Thus the scanner supporting drum 120 encloses an optical relay system as previously described with respect to FIGS. 2—6, and includes the high reflectively mirror 86 with a selected portion thereof removed to provide the medium slot 92 for entry of the recording medium 202. However, since magnetooptic readout is not employed, there is no need for the magnetic head 94 of FIGS. 2—6, and accordingly a medium guiding member 204 having a similar configuration is employed to position the tape along the scan plane. A circular slot 206 is provided in the guiding member 204 along the scan path, and a light gathering means 208, e.g., a photomultiplier tube, etc., is disposed along the length of the circular slot 206 to receive the light beam which impinges and passes through the previously recorded medium. The amplitude of the light intensity which passes through the medium 202 is indicative of the recorded history on the medium. Thus the electrical signal introduced from the light gathering means 208 to a utilization circuit 210 is likewise indicative of the history.

The optical relay system of the previous FIGS. may be employed in the photographic readout embodiment 200 of FIG. 7. However, since magnetooptic readout is not employed it follows that the beam does not have to impinge the medium at the previously described angle (e.g., 45°). Thus, the simplified optical relay system illustrated by the single plane of optics in FIG. 7, may be employed. Accordingly, the entrant beam 108 enters the scanner assembly along the axis 112, is deflected radially by the mirror 56 to a mirror 212. From thence the beam is directed to a (single) spot forming lens 214 similar to those of the previous FIGS. and is focused on the medium 202. The spot 215 which impinges the medium in the readout region of the mirror 86, i.e., where the light gathering means 208 is disposed, passes through the medium 202 and into the readout apparatus. Thus no light is reflected to the succeeding portions of the optical relay system. However, to describe further the optical relay system, the path of the light beam is depicted in phantom line as it would appear if the lens 214 and its respective spot 215 were impinging the mirror 86; e.g., if the scanner rotated to a position where lens 214 focused on the mirror 86. In this case, the beam is reflected from the mirror 86 is collimated by the (single) lens 214, and reflected from a mirror 216 radially across the scanner assembly to a mirror 218. The beam is refocused to a second spot 220 via a (single) lens 222, is reflected from mirror 86, collimated by the (single) lens 222 and deflected to the mirror 76 via the mirror 74.

Note that the beam passes through the lenses 214, 222 at a slight angle to allow positioning the mirrors 212, 216 and 218, 74 respectively for readily introducing and retrieving the beam.

We claim:

1. A multiple spot optical scanner for tracing a continuous light scan along a selected scan path including a recording medium, including a stationary and a rotating frame of reference, comprising the combination of:

source means associated with the stationary frame of reference for providing at least one entrant light beam;

rotatable support means associated with the rotating frame of reference, having a rotational axis and adapted to receive the entrant light beam;

optical means rotatable with the support means for periodically directing and focusing the entrant light beam to define at least a pair of sequentially focused light spots;

reflective means defining said selected scan path and disposed to receive the focused light spots thereon; optical means for retrieving the reflected light beam from said reflective means and said recording medium wherein one of the plurality of scan spots is always scanning the recording medium portion of the scan path while any remaining spot is selectively reflected from the reflective means.

2. The optical scanner of claim 1 including a selected recording medium disposed flush with the scan path and thus with the reflective means, wherein the selected portion of the scan path substantially corresponds to the width of the recording medium.

3. The optical scanner of claim 2 wherein said scan path describes a circular arc, and said reflective means comprises a cylindrical high reflectivity mirror.

4. The optical scanner of claim 2 wherein said scan path describes a flat field along a plane, and said reflective means comprises a circular high reflectivity mirror.

5. The optical scanner of claim 2 wherein said reflective means has a section removed of width commensurate with the number of scan spots, said recording medium being supported in place of said removed section with the surface of the medium lying along the selected scan path of said reflective means.

6. The optical scanner of claim 5 further including magnetic field generating means disposed adjacent the recording medium in the region of the scan path thereof and along the width of the medium.

7. The optical scanner of claim 2 wherein the source means provides the entrant light beam substantially along the rotational axis of the rotatable support means, and the optical means includes an optical relay system for generating the plurality of sequentially focused light spots in a selected configuration.

8. The optical scanner of claim 2 wherein said optical means further includes means for retrieving the beam upon impingement of the recording medium, and readout means for receiving and sensing the beam in response to the information stored in tee recording medium.

9. The optical scanner of claim 8 wherein the readout means includes a light gathering device disposed adjacent the recording medium and responsive to the intensity of light transmitted from the recording medium in response to impingement thereof by the scanning spots formed by said optical means.

10. The optical scanner of claim 8 wherein said optical means further includes a plurality of pairs of focusing and collimating lenses for forming respective spots and for retrieving the reflected light beam from said reflective means and said recording medium, and a plurality of mirror means disposed to introduce the entrant beam to a first of the plurality of pairs of lenses, to relay the beam from the first pair of lenses to a subsequent pair, and to retrieve the reflected beam from the last of the plurality of pairs of lenses upon consecutive formation of the plurality of spots.